US005682525A

United States Patent [19]
Bouve et al.

[11] Patent Number: 5,682,525
[45] Date of Patent: Oct. 28, 1997

[54] SYSTEM AND METHODS FOR REMOTELY ACCESSING A SELECTED GROUP OF ITEMS OF INTEREST FROM A DATABASE

[75] Inventors: W. Lincoln Bouve, Milton, Mass.;
William T. Semple, Arlington, Va.;
Steven W. Oxman, Riva, Md.

[73] Assignee: Civix Corporation, Salem, Mass.

[21] Appl. No.: 371,425

[22] Filed: Jan. 11, 1995

[51] Int. Cl.$^6$ ...................................................... G06F 17/30
[52] U.S. Cl. .......................... 395/615; 340/995; 364/460; 395/200.09; 395/329
[58] Field of Search ............................ 395/600, 155–161, 395/615, 329, 200.09; 340/990–995

[56] References Cited

U.S. PATENT DOCUMENTS

| | | | |
|---|---|---|---|
| 4,974,170 | 11/1990 | Bouve et al. | 395/357 |
| 5,214,757 | 5/1993 | Mauney et al. | 395/161 |
| 5,289,572 | 2/1994 | Yano et al. | 395/155 |
| 5,424,951 | 6/1995 | Nobe et al. | 364/443 |
| 5,543,789 | 8/1996 | Behr et al. | 340/995 |

*Primary Examiner*—Thomas G. Black
*Assistant Examiner*—Hosain T. Alam
*Attorney, Agent, or Firm*—Curtis A. Vock

[57] ABSTRACT

A user can access a common database from a remote communications port, at any qualified location, to generate a map or other positional information which locates selected items of interest, e.g., businesses, stores, architectural sites, and the like. The database contains information representing the items of interest, including, for each of the items of interest, positional coordinates, a geographic vicinity, and a selected category. The positional coordinates discretely locate the vicinity, while the vicinity specifies the exact locations of the items of interest in the selected category. For example, a user in New York can select the display of sporting shops in the area surrounding Chicago O'Hara International Airport selectively. A user can also access a port and display locations of items of interest within the same vicinity as the user and relative to the user's position. The database can be modified from qualified remote locations to change, or add to, the information therein. An advertisement can be tagged to the display or print out as an association with the selected items of interest.

37 Claims, 15 Drawing Sheets

Microfiche Appendix Included
(1 Microfiche, 28 Pages)

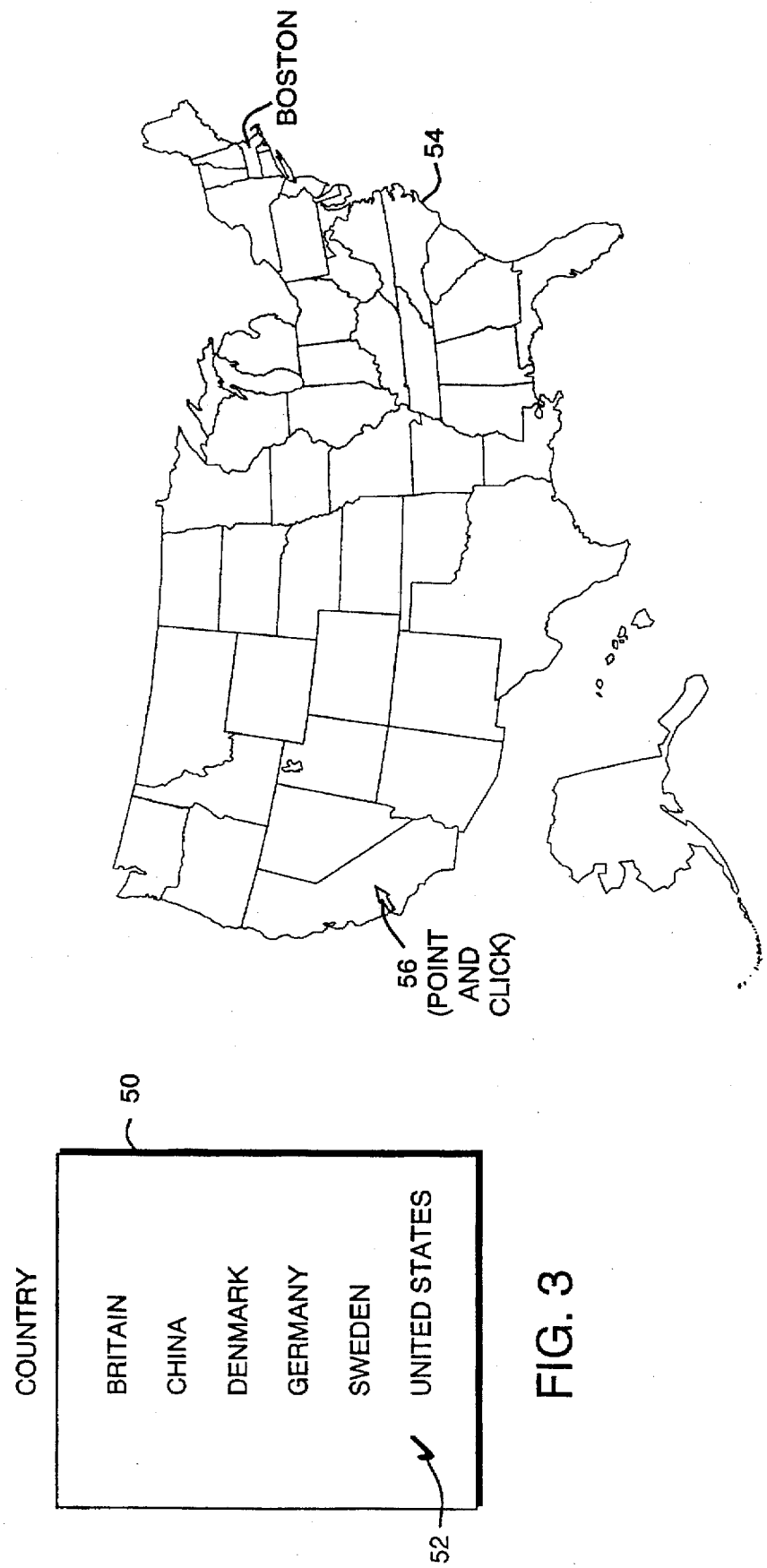

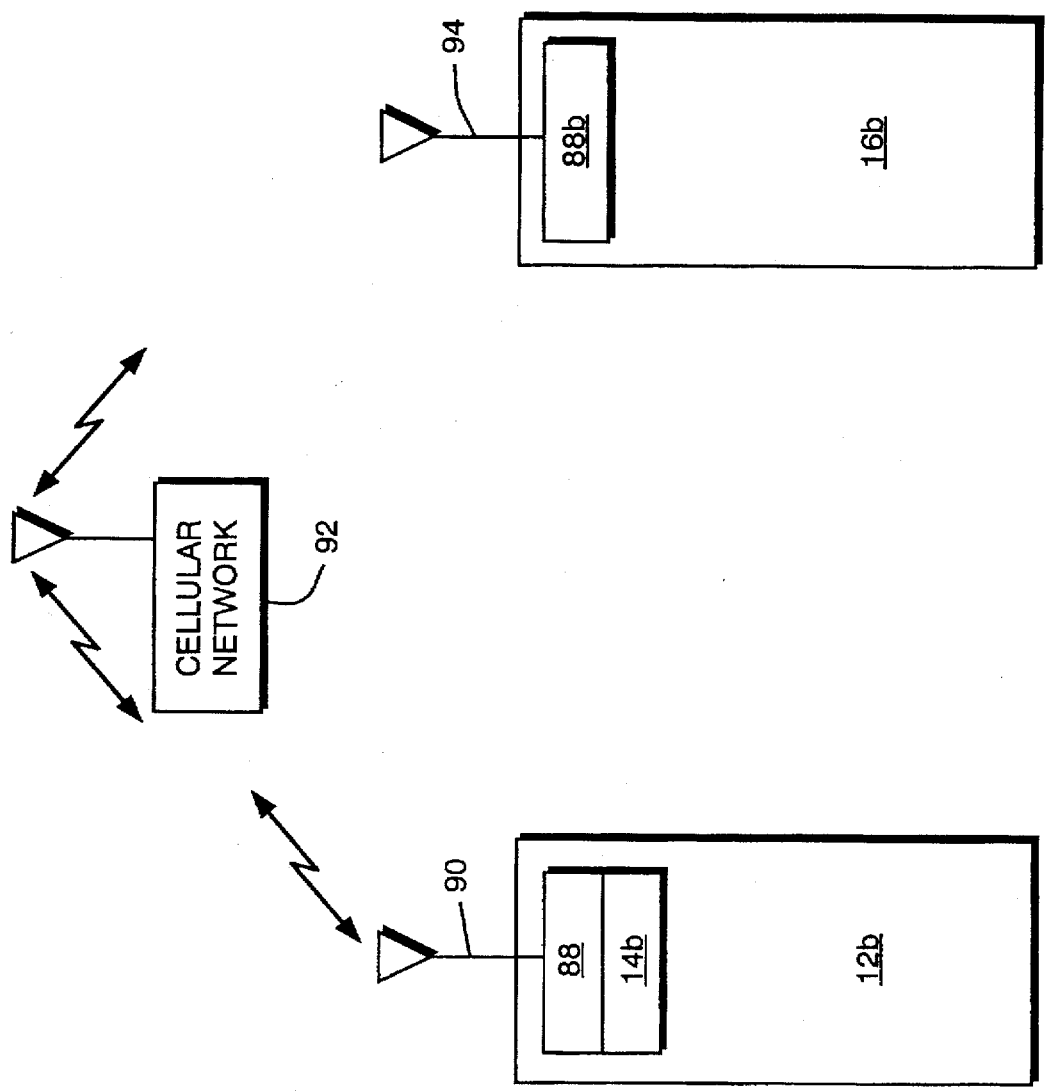

5,682,525

SYSTEM AND METHODS FOR REMOTELY ACCESSING A SELECTED GROUP OF ITEMS OF INTEREST FROM A DATABASE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application contains, for disclosure purposes, subject matter in the form of a microfiche appendix consisting of one microfiche slide with twenty-eight frames. The microfiche appendix sets forth non-limiting source code which is suitable for application with the invention.

BACKGROUND OF THE INVENTION

Electronic directories for identifying selected subscribers within a city are known in the prior art. For example, U.S. Pat. No. 4,974,170 describes one system which includes a fixed kiosk with an internal memory for storing locations such as businesses and historical sites within a predetermined distance from the kiosk. An input panel on the kiosk provides access to the data within the memory, and a map is generated by the system thereby locating the selected information from the kiosk.

However, such a system is inflexible. The map generated by the system is predefined; and thus the user cannot access or select information about businesses and historical sites outside of the predefined map. A user of the system must also know the exact location of the kiosk in order to use the system. Tourists and business travelers to the city are unlikely to know of the kiosk; and thus the kiosk system is of little use to such users. Further, a user must be physically present at the kiosk in order to access the information about the businesses and/or sites in the surrounding area.

In addition, the information stored within the kiosk's memory must be manually updated. This requires a series of cumbersome steps—including the physical acts of loading and downloading to the memory at the kiosk—to update the system in the event that information about a selected business changes, e.g., the business closes.

It is, accordingly, an object of the invention to provide systems and methods which reduce or remove the aforementioned difficulties.

It is yet another object of the invention to provide a system for remotely accessing selective items of interest from a database; and for displaying a geographic vicinity of the items of interest to the user selectively and at the remote location.

Still another object of the invention is to provide a system for remotely providing information identifying locations of selected items of interest at a selected destination location.

These and other objects will be apparent in the specification which follows.

SUMMARY OF THE INVENTION

As used herein, "items of interest" means services, products, geographic sites, architectural sites, stores, restaurants, public services, and other items which a user of the invention may wish to locate. "Port," "remote access port," "terminal," or "remote access terminal" are used interchangeably to denote a terminal, e.g., a personal computer with modem, from which a user of the invention can access the database storing the information about the items of interest. "Remote database" or "database" are used herein to denote a database, e.g., a client server, which stores information for access by a user of the invention from a port. "Communication link" is used to denote means, including for example a telephone line, for communicating between the database and the port. "Geographic vicinity," and "map" are used to denote a geographic region which includes and surrounds selected items of interest.

In one aspect, the invention provides a system for remotely determining the position of a selected category of items of interest in a selected geographic vicinity from a database. A database stores information about a plurality of items of interest, including, for each of the items of interest, positional coordinates, a geographic vicinity, and at least one associated category. A communications link facilitates communications between a user of the system and the database. The system also provides for transmitting a portion of the information in the database to a user via the link upon receipt of a request signal representative of a selected category and geographic vicinity. Preferably, that transmitted portion of the information includes identification of a position for the items of interest within the selected category and geographic vicinity. The system further provides a port for remotely accessing the portion of information via the link. Specifically, the port generates the request signal in response to inputs by a user of the system; that signal being representative of the selected category and geographic vicinity. A user interface at the port accepts the inputs and communicates the position of each of the items of interest in the selected category and geographic vicinity to the user.

In accord with other aspects of the invention, the communications link can include several technologies, including a telephone link, satellite link, radio-frequency link, infrared link, internet link, facsimile link, fiber-optic link, coaxial cable link and television link. The database is, typically, a personal computer, mainframe, workstation, mini-computer, or digital data processor. To communicate the information to a user, the user interface can include a television, telephone, facsimile, audible speaker, and/or personal computer display. To accept user inputs at the port, the user interface can further include a television interface, telephone interface, facsimile interface, and/or a personal computer interface.

Preferably, the geographic vicinity includes certain spatial detail of the items of interest. For example, the geographic vicinity can include a map of the items of interest in the selected category, as well as street and landmark information displayed relative to the user's position at the remote port. As such, the set of positional coordinates generally identifies either (i) a location of a user of the system, or (ii) a destination location within the geographic vicinity.

In certain aspects of the invention, the information within the database further includes additional detail about at least one of the items of interest. Such a feature is advantageous in that, once the port displays the geographic vicinity with the items of interest, a user can thereafter select further additional detail about one or more of the items of interest. In this manner, for example, an item of interest such as a restaurant can display a picture of the interior of the restaurant to the user. The additional detail can include other multimedia information, such as video, prerecorded music, and digital pictures.

In still another aspect, the Invention also communicates at least one advertisement associated with at least one of the items of interest to the user. As such, certain advertisers that are connected with the selected category of items of interest can promote a name or business. In one aspect of the invention, the information within the database is arranged hierarchically. In this aspect, there are a plurality of discrete geographic vicinities (each set of positional coordinates corresponding to one discrete location within the geographic vicinity). The system thus provides for hierarchically selecting any of the discrete vicinities from the port in a hierarchical manner.

In still another aspect of the invention, database apparatus is provided for storing information about a plurality of items of interest. As above, that information includes, for each of the items of interest, positional coordinates, a geographic vicinity, and at least one associated category. A communications link provides for communicating between a user of the database apparatus and a remote port. The database apparatus further provides for transmitting a portion of the information to a user via the link upon receipt of a request signal representative of a geographic vicinity and a selected category of the items of interest. That transmitted portion of the information includes an identification of a position for the items of interest within the selected category and geographic vicinity.

The invention also provides, in another aspect, a remote access port for remotely accessing a selected category of items of interest in a selected geographic vicinity from a database such as described above. The port includes means for generating a request signal representative of a selected category and a selected geographic vicinity of the items of interest in response to inputs by a user of the port. A user interface accepts the inputs and indicates the position of each of the items of interest within the selected category and geographic vicinity.

In another aspect, the information includes additional detail for at least one of the items of interest, and the port further includes means for (i) generating a signal representative of a selection of at least one of the items of interest, and (ii) communicating the additional detail to the user.

The invention also provides a method for remotely determining the position of a selected category of items of interest in a selected geographic vicinity from a database, comprising the steps of: (i) storing information about a plurality of items of interest in the database, the information inducting, for each of the items of interest, positional coordinates, a geographic vicinity, and at least one associated category; (ii) accessing the database from a remote location and over a communication link; (iii) communicating, from the remote location, information representative of a selected category and a selected geographic vicinity to the database; and (iv) transmitting a portion of the information from the database and to the user over the link, the information including, at least, identification of a position for the items of interest within the selected category and geographic vicinity.

The invention is next described further in connection with preferred embodiments, and it will be apparent that various additions, subtractions, and modifications can be made by those skilled in the art without departing from the scope of the invention.

BRIEF DESCRIPTION OF THE ILLUSTRATED EMBODIMENTS

A more complete understanding of the invention may be obtained by reference to the drawings, in which:

FIG. 1 schematically illustrates a system constructed according to the invention;

FIG. 3 shows a user interface display of various worldwide countries providing selectable locations according to the invention and which can be displayed to a user of the system of FIG. 1;

FIG. 3A shows a user interface display of a map of the United States providing selectable locations according to the invention and which can be displayed to a user of the system of FIG. 1;

FIGS. 6A and 6B illustrate various components and methods, according to the invention, for constructing a communications link suitable for use in the system of FIG. 1;

Figure 1:
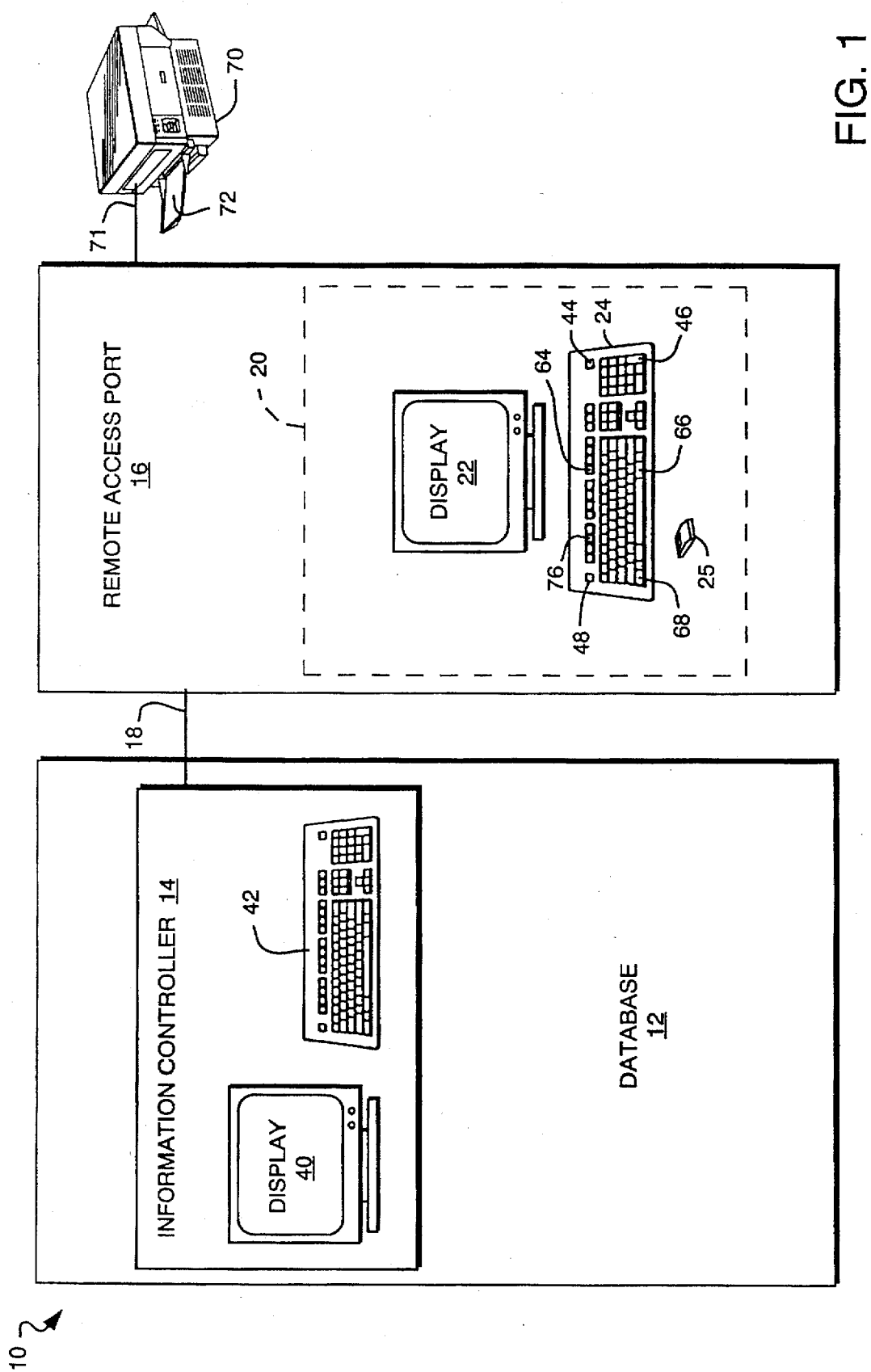
Figure 9:
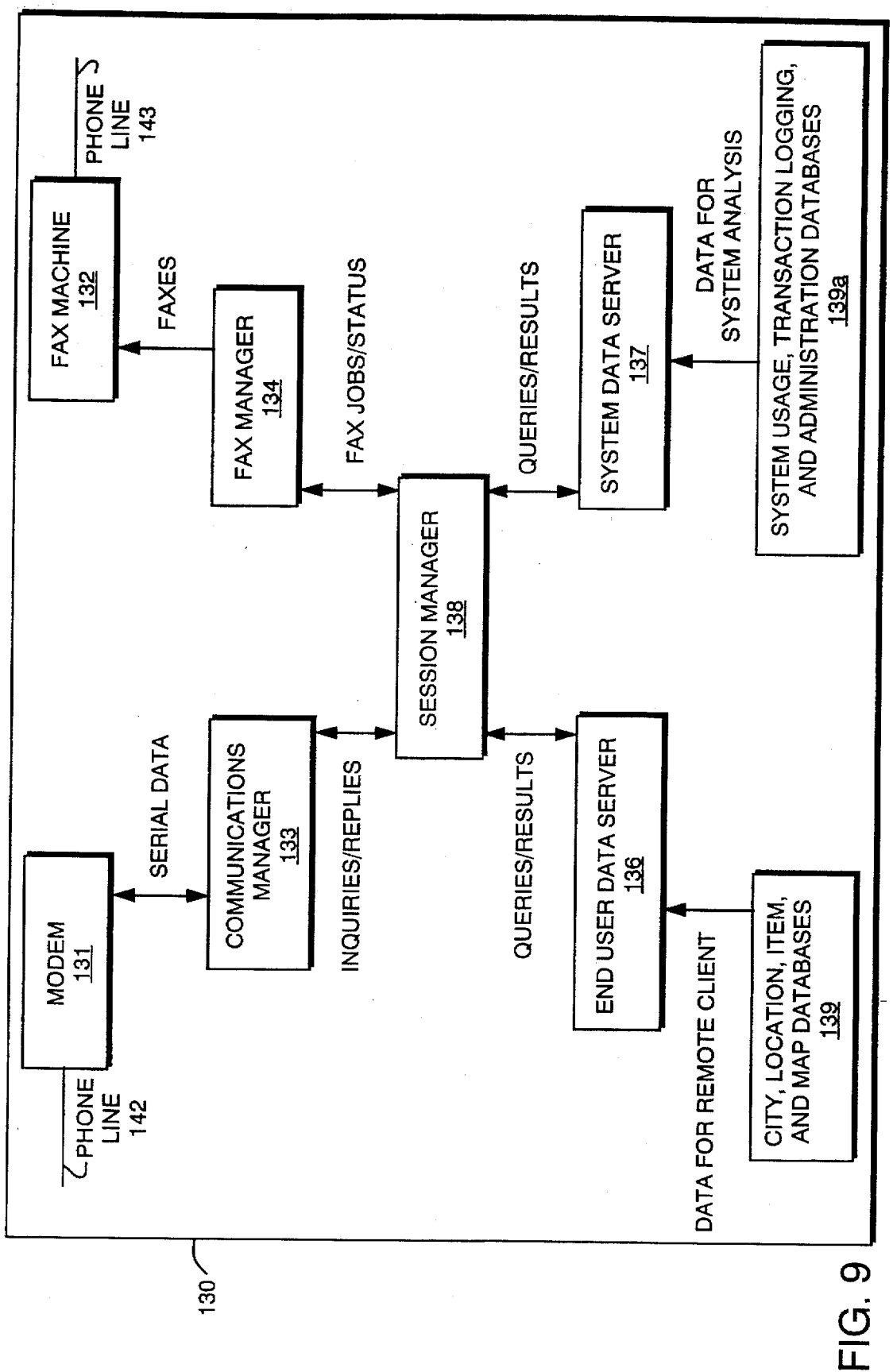
Figure 10:
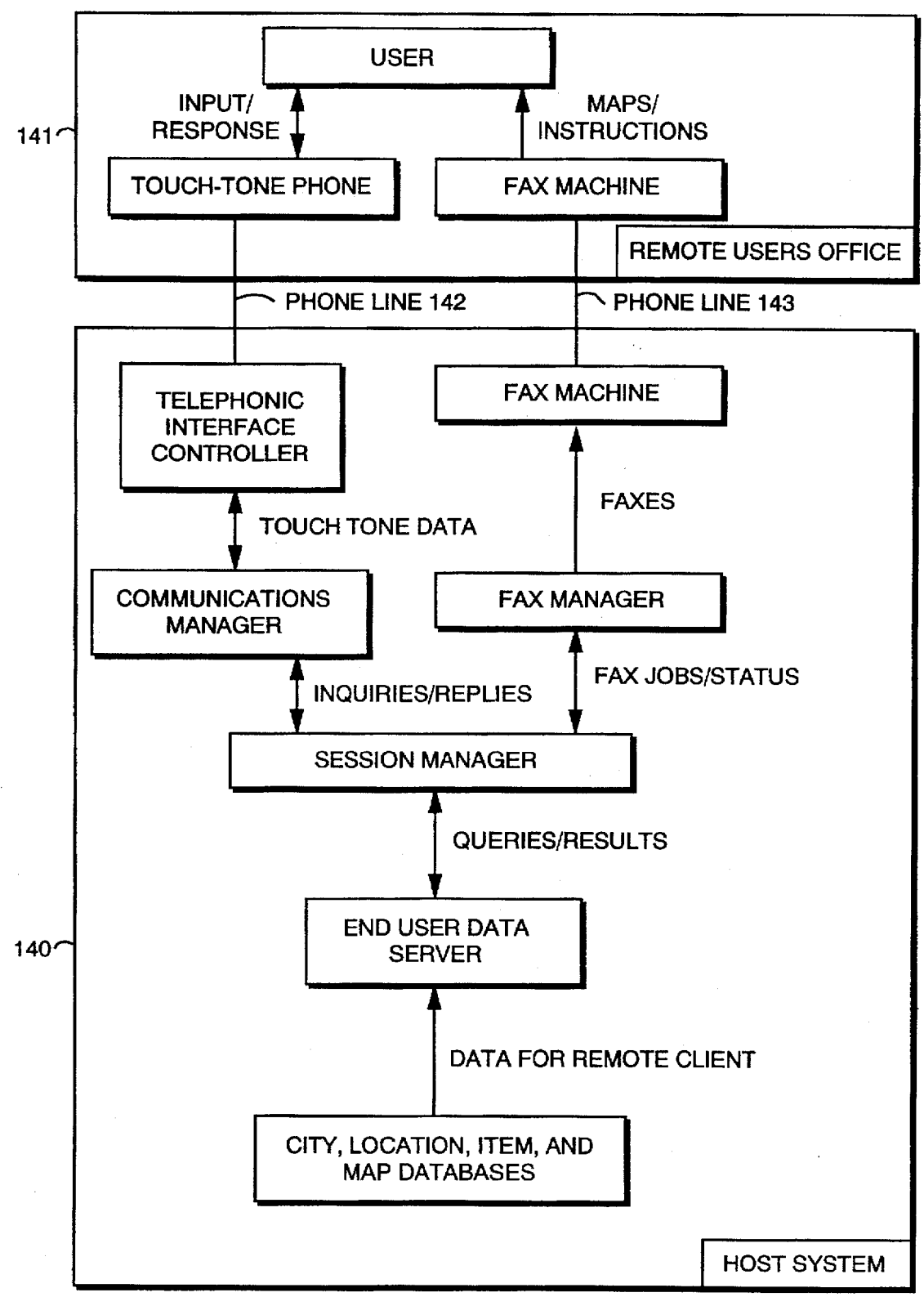
Figure 11:
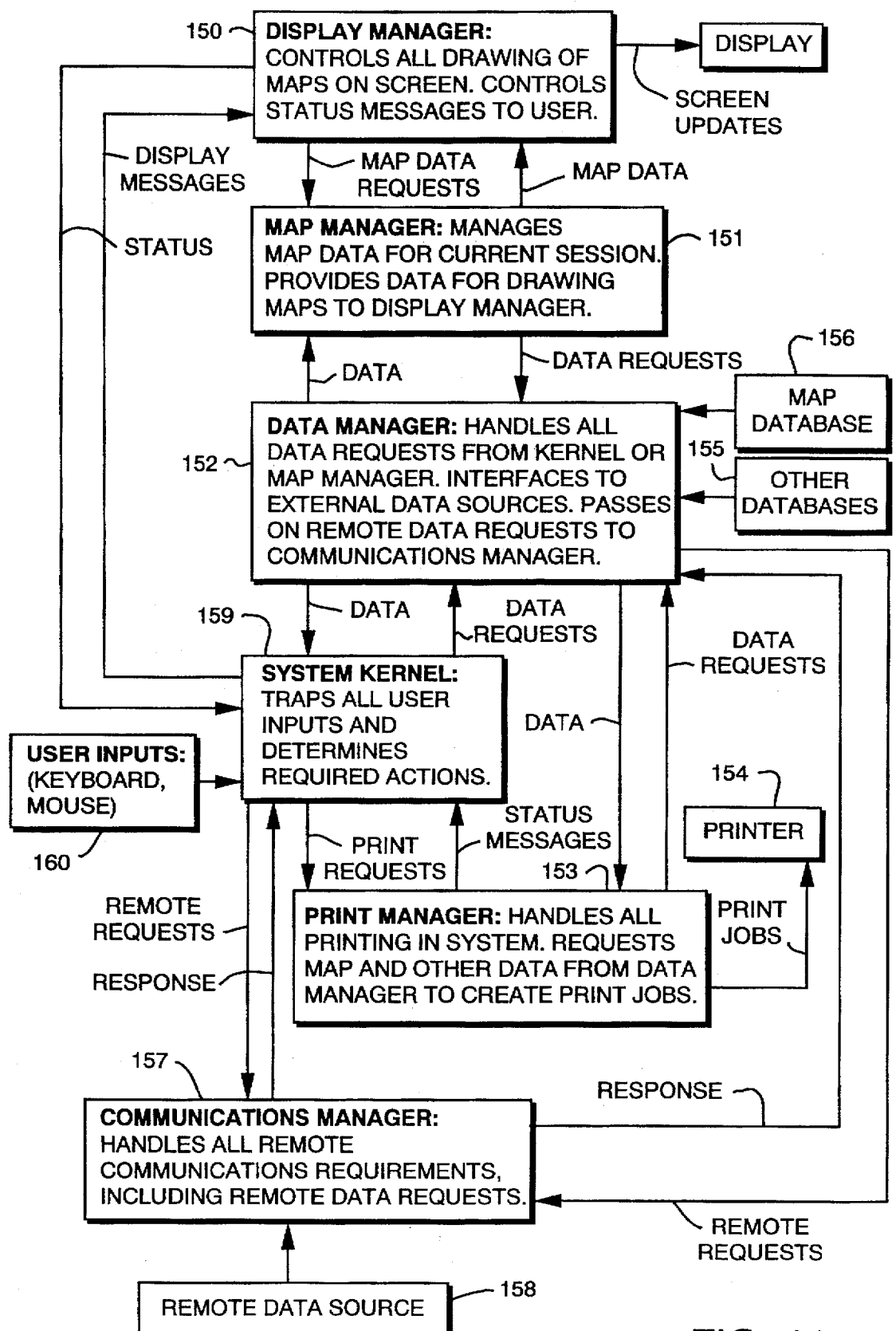
Figure 12:
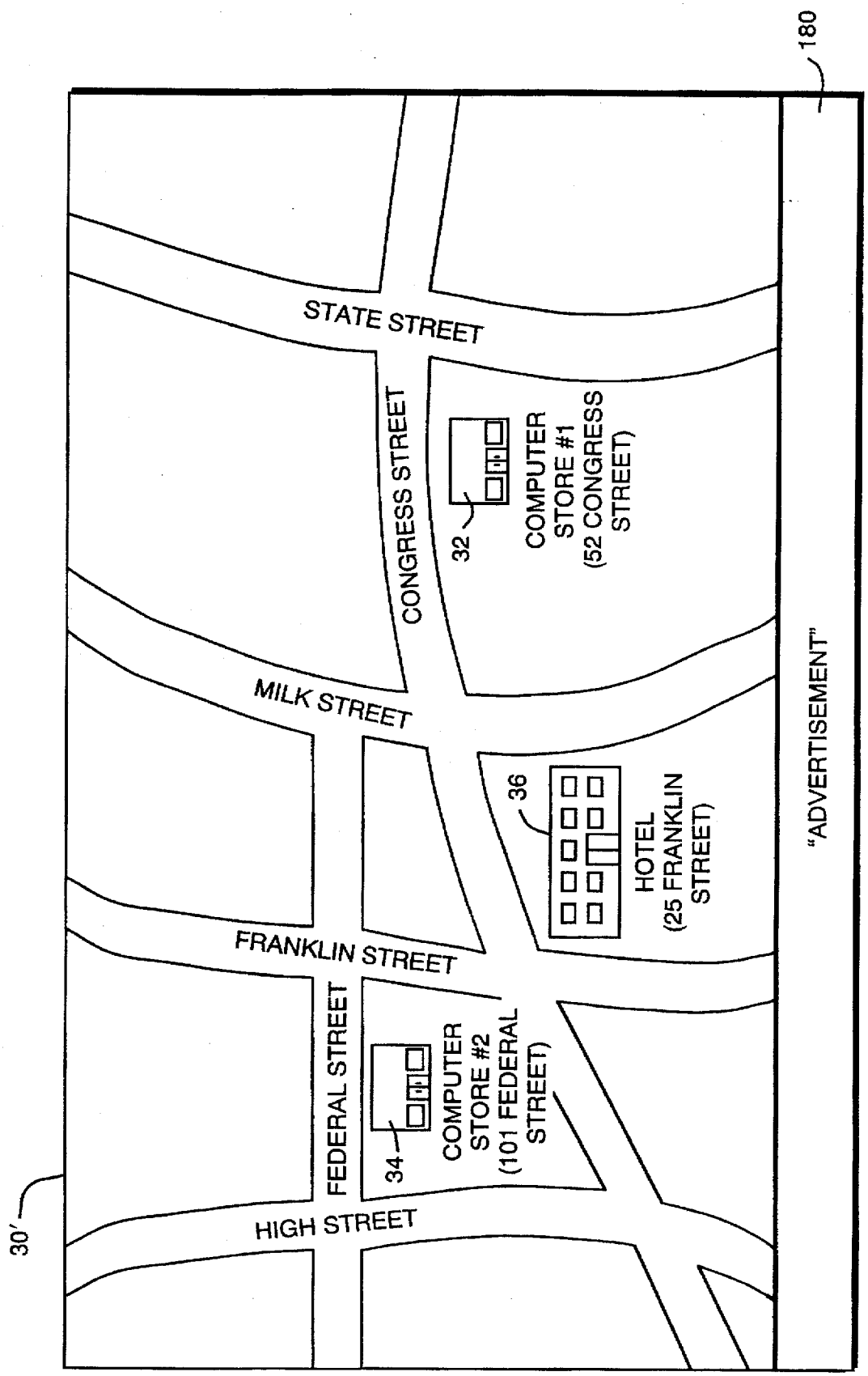

FIG. 9 schematically illustrates system architecture, constructed according to the invention, which forms a database suitable for use as the database of FIG. 1, and which services both phone and fax information and internal administrative data;

FIG. 10 shows one system architecture according to the invention, and which includes a host database and a remote port;

FIG. 11 illustrates process flow and system architecture for interfacing between user inputs and the database, in accord with the invention; and FIG. 12 shows one representative display or print-out, according to the invention, which includes an advertising field associated with the items of interest.

DETAILED DESCRIPTION

FIG. 1 illustrates a system 10 constructed according to the invention. A database 12 stores information about the items of interest, including information about locating the items of interest. The database 12 includes an information controller 14 which communicates with a remote access port 16 via a communications link 18 and which controls the access and flow of information into and out of the database 12. The information within the database 12 is accessible by the remote access port 16 upon request by a user of the port 16. Accordingly, the port 16 preferably includes a user interface section 20 which provides a graphical display 22, keyboard 24, and mouse tracker 25 (for pointing and clicking on selected display items within the display 22).

Figure 2:
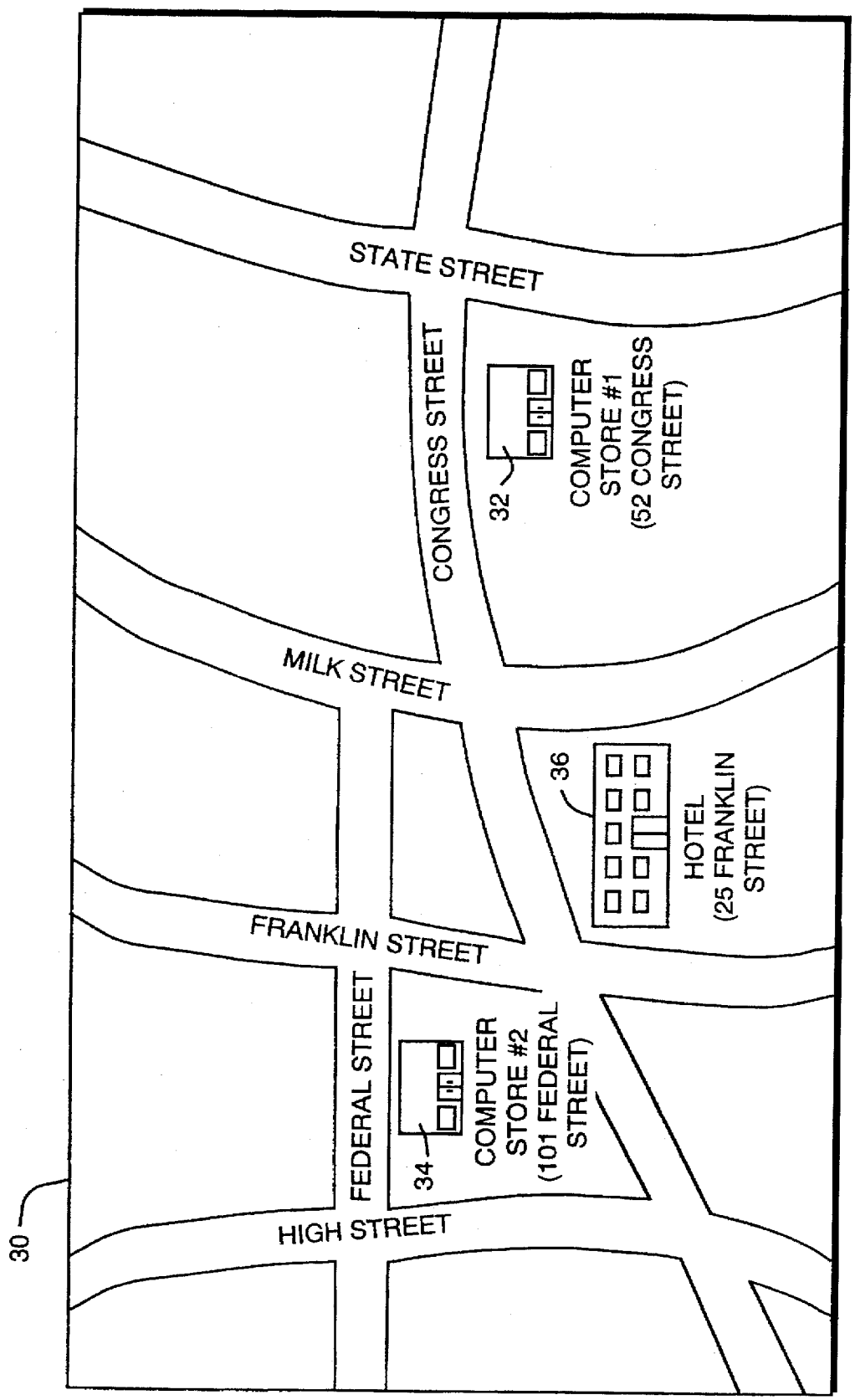
FIG. 2 shows a typical graphical illustration locating items of interest and which can be displayed to a user of the system of FIG. 1.

Specifically, the information within the database 12 includes, for each of the items of interest, positional coordinates, a geographic vicinity, and at least one associated category. Preferably, this information includes a graphical representation so that a user can easily interpret the information. FIG. 2 shows one exemplary display 30 of information locating computer products in downtown Boston, Mass. Accordingly, the associated category in this example is "computer products," and, in the illustrated display 30, the geographic vicinity includes the selected items of interest, including (i) the two computer stores 32, 34 at, respectively, 52 Congress Street and 101 Federal Street; and (ii) that area which is displayed within the display 30 and which surrounds the items of interest, such as that area displayed between the streets of High Street and State Street.

The positional coordinates, as part of the selected information, operate to locate the geographic vicinity. Briefly, the positional coordinates locate one location within the geographic vicinity—such as the center of the vicinity—so that items of interest can be determined relative to the positional coordinates and within the geographic vicinity. In addition, the geographic vicinity is preferably a rectangle of information, with North situated upwards.

In one preferred aspect of the invention, the display 30 is centered relative to the location of the user (as such, the positional coordinates of the information are set to the user's present position). For example, if the hotel 36 at 25 Franklin Street has a port 16 therein, a user of the invention can (i) access that particular port and hence the information within the database 12, and (ii) display the items of interest relative to the user's current location, i.e., at the hotel 36. Accordingly, in this embodiment, the display 30 is generated with the hotel 36 at the center of the display—corresponding to the positional coordinates of 25 Franklin Street—and the selected items of interest in the associated category are displayed on streets relative to the hotel 36. In this fashion, a user can easily walk or drive to the items of interest after leaving the hotel 36. Such a feature also gives the "appearance" to the user that the hotel 36 is at the center of activity, a desirable marketing feature for the invention.

With further reference to FIG. 1, the controller 14 preferably includes a display 40 and a keyboard 42 so that an operator of the system 10 can add and modify the information within the database 12. This is especially useful because information about the items of interest changes regularly; and thus the information within the database 12 is preferably updated on a regular basis so that users of the system 12 receive accurate information. For example, in a typical commercial location such as illustrated in FIG. 2, new retail stores open and existing retail stores close throughout the year. The invention thus provides for updating information within the database 12, such as through the control of a system operator typing commands at the keyboard 42.

Alternatively, the system 10 provides for remotely updating the database 12 with new information via any of the ports 16 or via a remote computer with a modem, described in more detail in connection with FIG. 6A. Specifically, the controller 14 provides access security which allows only authorized access for modification of the database 12. As such, a system administrator at a remote port 16 can download information to the database, or modify existing information within the database, as needed and without physically operating the keyboard 42.

The communications link 18 of the invention can take many forms. It is generally impractical to "hard-wire" each remote access port 16 to the database 12; so the form of the communications link 18 generally includes existing communication networks, such as one or more of the following: telephone lines, fiber-optic cabling, satellite communications, cellular communications, radio and microwave-frequency communicators, infra-red communicators, the facsimile mechanism, airphones, modems, the internet, co-axial cabling, television including interactive TV communications, and the like. These communication networks and subsystems are readily known to those skilled in the art without further reference hereto. Nevertheless, FIGS. 6A-6B illustrate representative communication links, according to the invention, which comprise one or more of these communication networks.

Figure 7B:
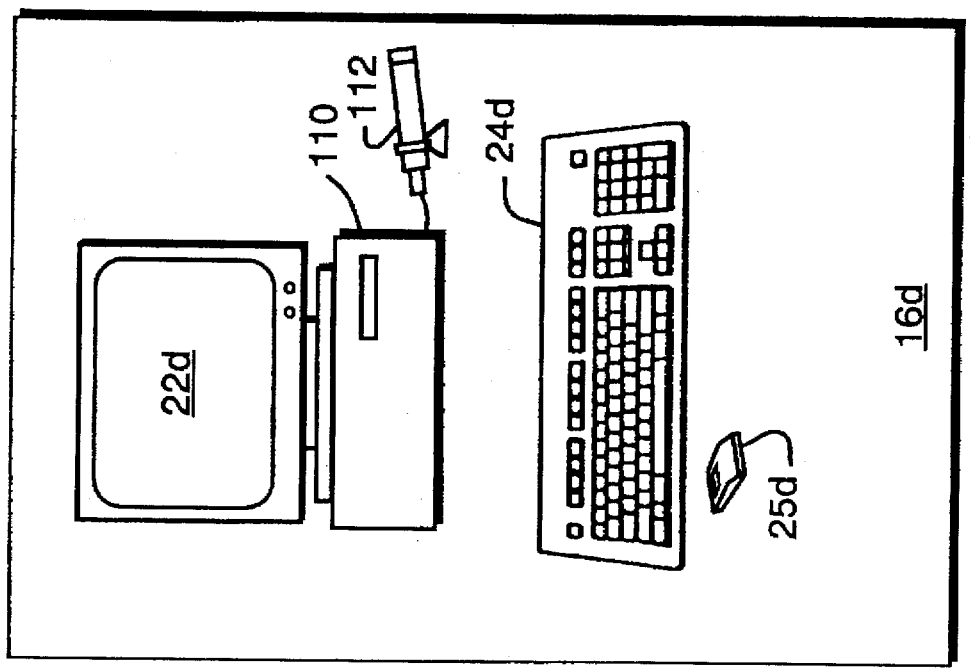
FIGS. 7A and 7B illustrate various remote port display technologies, according to the invention, which are suitable for use within the remote port of the system of FIG. 1.
Figure 7A:
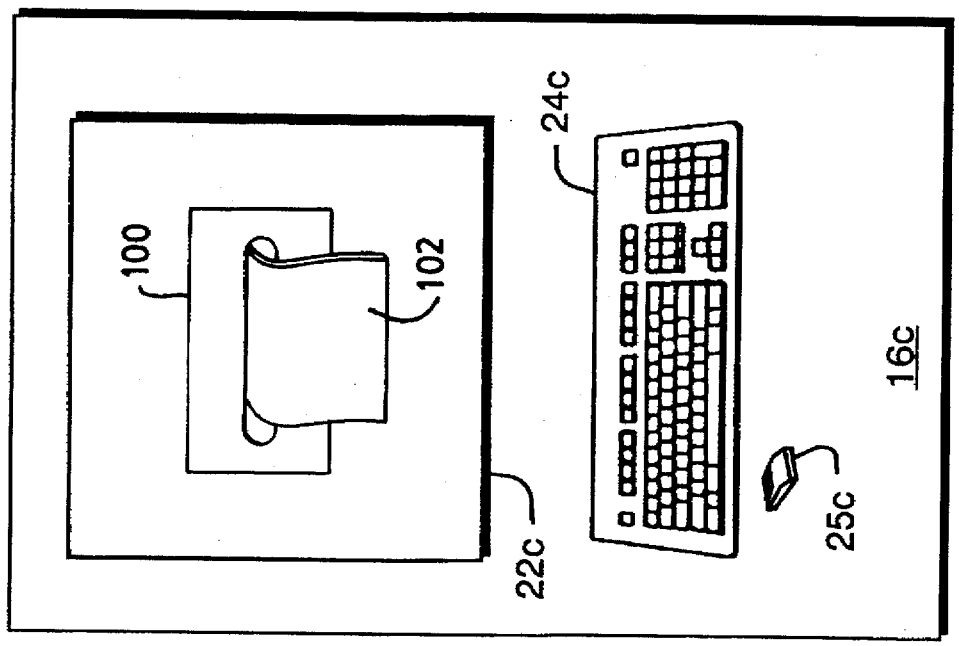

The displays 22 and 40 of FIG. 1 include those displays known to those skilled in the art, including the cathode-ray-tube (CRT), Liquid Crystal Display (LCD), and an array of Light Emitting Diodes (LEDs). However, the display 22 can also take the form of a paper or voice communication port, such as a facsimile output (hard-copy), printer, a voice communication synthesizer with automated digitized voice responses, a voice-driven menu systems, or as other devices capable of rendering digitized or analogue output signals. FIGS. 7A and 7B below illustrate some of these alternative forms of the display 22.

The remote access port 16 is generally provided at locations of public access in a city. Accordingly, the invention supports a nearly unlimited number of ports 16 that are connected for communication with the database 12, each of the ports being connected to the database 12 such as shown in FIG. 1 and such as described in more detail below. For example, the port 16 of the invention is appropriately placed in one or more hotels, restaurants, and public facilities (such as a train station) in the city. In Boston, Mass., therefore, the port 16 of the invention would ideally be accessible at several different locations, particularly at busy locations, such as at (i) North and South Stations, (ii) Logan Airport and at each of the several airport terminals, (iii) within several (or many, if not all) of Boston's hotels and restaurants, and (iv) at car rental locations.

The invention provides, generally, two modes of operation for a user accessing the port 16. In the first mode of operation, the user within the desired geographic vicinity accesses the database through the port 16 for information about the items of interest located near-by. This mode was described in connection with FIG. 2. That is, when the user is located within the geographic vicinity, e.g., at the hotel 36, a user can locate any of the items of interest relative to the hotel 36 and display items of interest in the associated category, e.g., computer products, through a street map connecting streets to and from the hotel 36. In this manner, as described above, a user can easily locate the items of interest from his or her present location, which determines the positional coordinates of the geographic vicinity.

In one embodiment of the invention, a user accesses this first mode of operation by selecting the "LOCAL INFO" key 44 on the keyboard 42, FIG. 1. Upon selection, the system 10 provides information, such as a graphical display shown in FIG. 2, at the port 16 to locate items of interest within the geographic vicinity of the user and relative to the user's current location. The scope of the geographic vicinity is generally within walking distance.

In the second mode of operation, a user is nowhere near the desired geographic vicinity but nevertheless desires information about items of interest at a destination location (for example, it is generally impractical to display all items of interest within a one hundred mile radius; rather it is more convenient to display locations of items of interest in a format that is relative to his desired destination). In one embodiment of the invention, such a user selects the "REMOTE INFO" key 48 to access the desired set of destination position coordinates. For example, a user who is leaving Boston Logan Airport for Los Angeles International Airport (LAX) can access a port 16 at Logan and display, selectively, items of interest in an associated category relative to LAX. For example, if a user of the invention wishes to locate music stores upon arrival in Los Angeles, she can command the display of music stores relative to LAX so that they are easily located.

In order to command the display of items of interest at the destination location, and in accord with one embodiment of the invention, a user first selects "USA" at the port 16 via the keyboard 24, then the user sequentially selects "California," "Los Angeles," and finally "Los Angeles International Airport." Each of these selections are provided to the user in a menu format on the display 22, such as known to those skilled in the art.

Figure 3C:
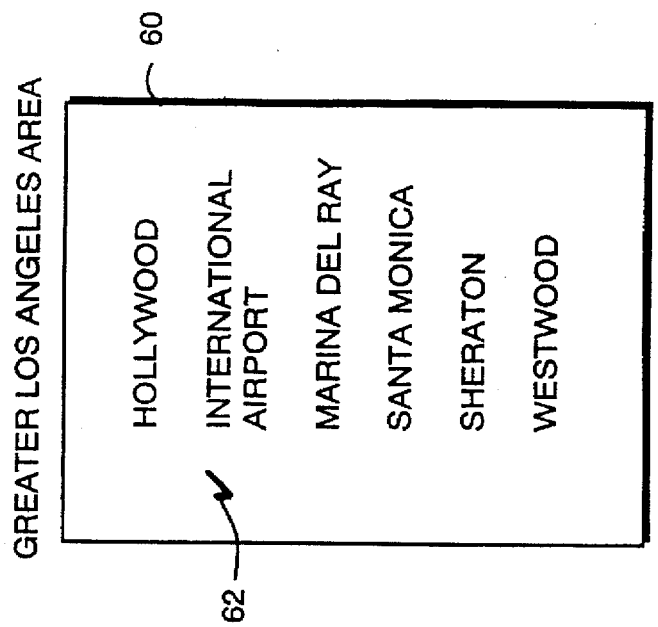
FIG. 3C shows a user interface display of various selectable locations within greater Los Angeles according to the invention and which can be displayed to a user of the system of FIG. 1.
Figure 3B:
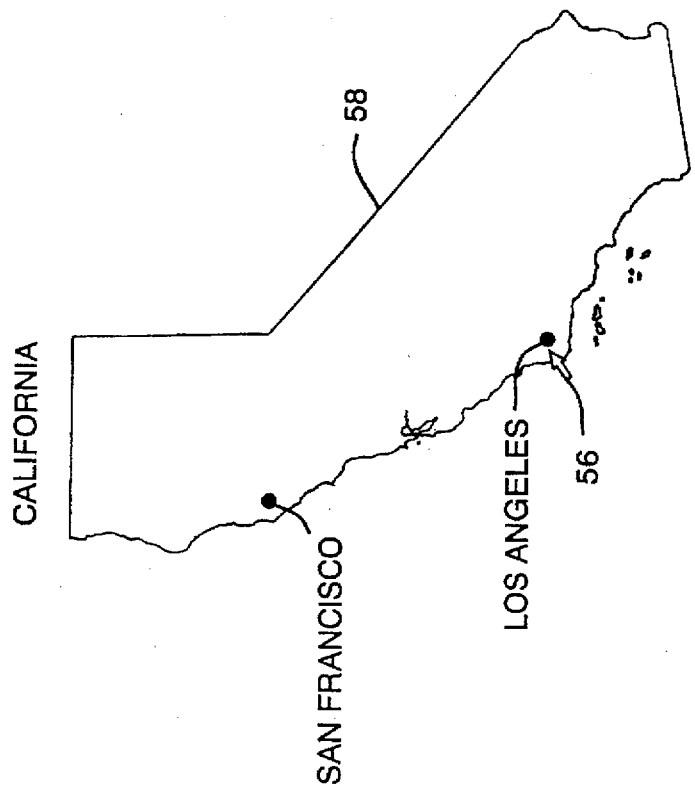
FIG. 3B shows a user interface display of a map of California providing selectable locations according to the invention and which can be displayed to a user of the system of FIG. 1.

FIGS. 3–3C schematically illustrate this display and selection process according to one embodiment of the invention. FIGS. 3–3C show successive displays which are displayed on the display 22, FIG. 1. Specifically, the system 10 of FIG. 1 first provides information to the display 22 that represents a selection 50 of various countries which can be selected by a user, such as shown in FIG. 3. In this example, a user selects the "United States" (such as shown by the check-mark 52). The system 10 thereafter provides information to the display 22 that represents a map 54 of the United States, shown in FIG. 3A, so that a user can point and select "California" with a mouse pointer 56 via the mouse tracker 25. Upon selection, an outline 58 of California is displayed, including many, if not all, of its major cities, as shown in FIG. 3B (for illustrative purposes, only Los Angeles and San Francisco are identified).

With the outline of California displayed, a user can select "Los Angeles" by again pointing the mouse pointer 56 onto the city identified as Los Angeles and clicking the mouse tracker 35. Thereafter, an alphabetic listing 60 of well-known places is provided by the system to the display 22, as shown in FIG. 3C, so that a user can, appropriately, select a geographic vicinity within which to locate the items of interest. In this example, a user would appropriately select Los Angeles International Airport, as illustrated with a check-mark 62.

As should be clear to those skilled in the art, the successive display of information within the display 22 can be accomplished in several ways, each of which is within the scope of the invention. For example, the display of information shown in FIGS. 3–3C can be done through menus only, and without the map illustrations shown in FIG. 3A and 3B. That is, a menu of information can replace the maps of FIGS. 3A and 3B, such as for example provided in FIGS. 3 and 3C. A menu of the United States, for example, at least includes a listing of the several states; and a map of California at least includes a menu listing of its major cities.

Likewise, the display of information on the display 22 can entirely be in graphical form. In such a case, the menus of FIG. 3 and 3C are replaced, respectively, with (i) graphical representations of the world, and (ii) graphical locations of key items of interest within the greater Los Angeles area.

Accordingly, the default display of information to a user monitoring the display 22 is a mixture of graphics and menus, such as shown in FIGS. 3–3C. However, a user can select only the display of graphic information by activating the "GRAPHICS" key 64, FIG. 1. Likewise, a user can also select the "MENU" key 66 to display information in the menu (text) mode. Those skilled in the art should appreciate that other keys, key names, and combinations of keys can be used in accord with the invention to select and/or display other information. For example, a print key 68 provides a command for printing the current display of the port 16, which therefore preferably includes an attached printer 70 connected via communication line 71.

Figure 4:
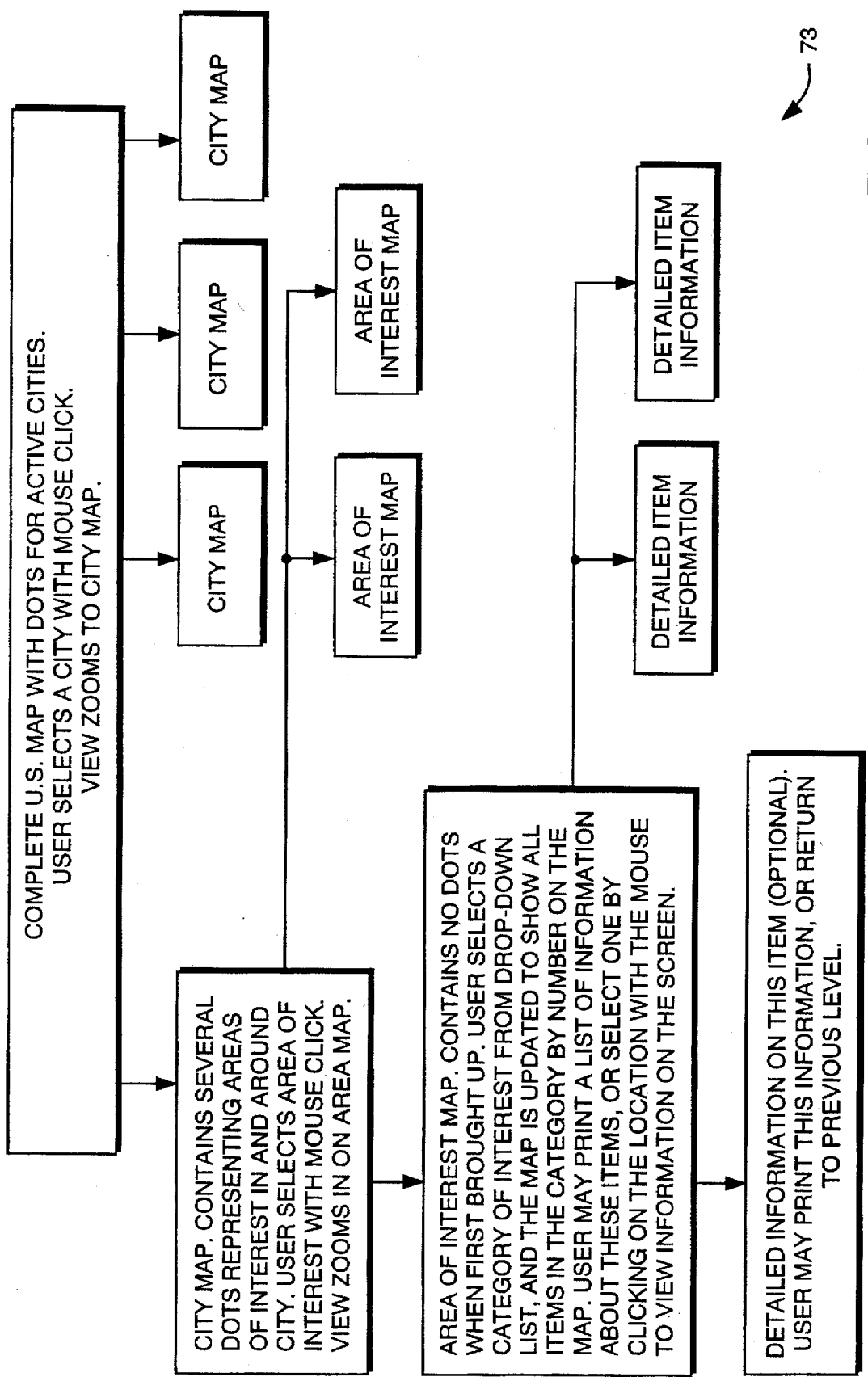
FIG. 4 illustrates a top level process flow, according to the invention, for providing information to a user at the remote port of FIG. 1.

FIG. 4 illustrates one embodiment of the invention showing a process flow 73 for providing information about selected items of interest to a user at the remote port. The flow 73 includes instructions at different levels of abstraction, such as at the U.S. level dry level, and at the specific areas of interest, which help a user to select and locate the items of interest.

Thus, it is preferred, according to the invention, that a user's selected display of items of interest within an associated category and geographic vicinity is accessed hierarchically within the database 12. As such, each set of positional coordinates corresponds to a discrete remote port location of one geographic vicinity.

Figure 4A:
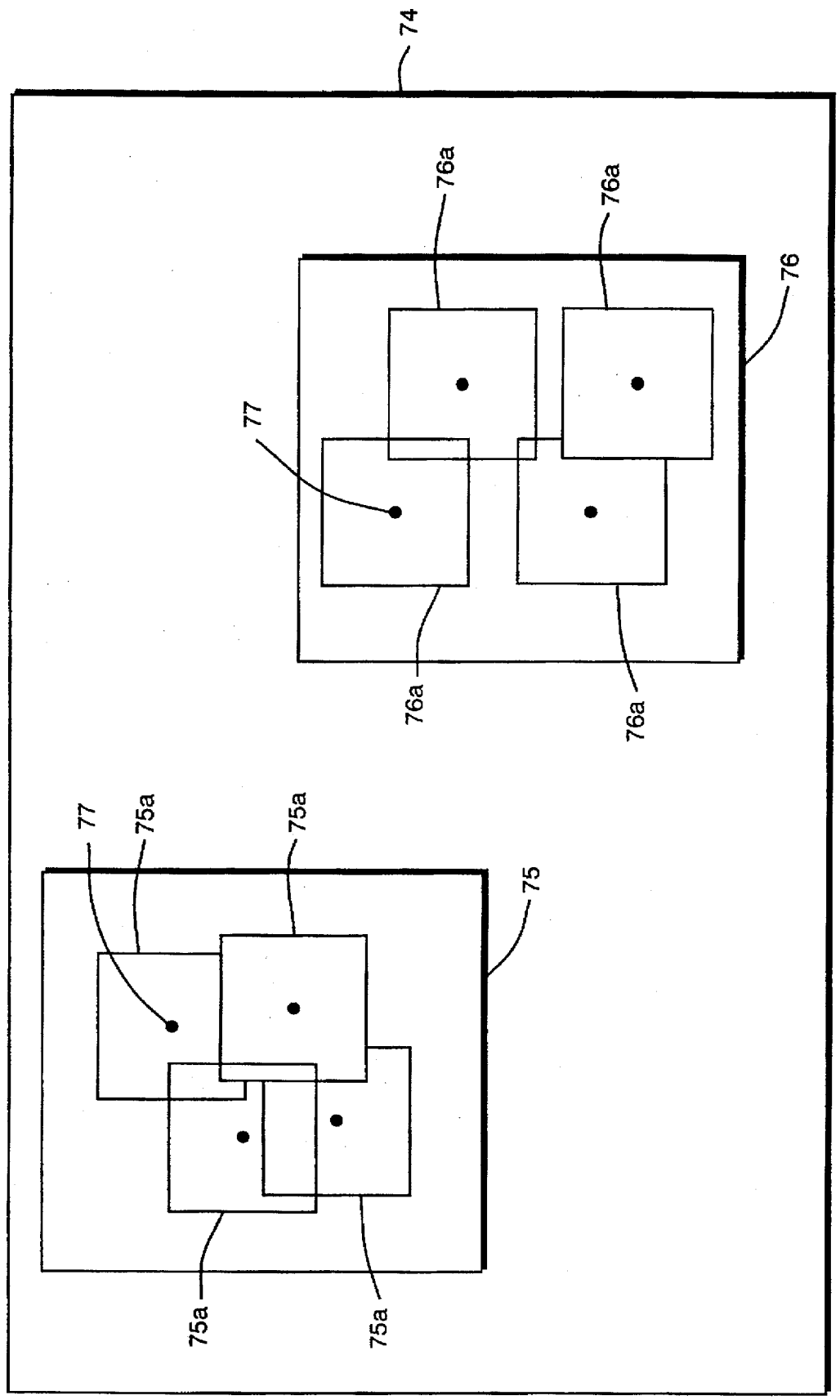
FIG. 4A shows a hierarchical structure of geographical vacinities, according to the invention.

FIGS. 4 and 4A illustrate this hierarchical approach. If, for example, a user at a remote port has commanded the display of one geographic vicinity (i.e., an area of interest map) and selects the display of a different geographic vicinity, it is necessary to first return to the associated city map, or even to the U.S. map, depending on the desired location, to access that different geographic vicinity.

FIG. 4A schematically illustrates this selection by way of a U.S. map 74 which includes two city maps 75, 76. The geographic vacinities 75a, 76a within each city map, respectively, are selectable by hierarchically selecting the appropriate city map first. In this manner, if a user is currently displaying one vicinity 74a, and desires a display of a vicinity 76a, the user must first successively select the city map 75, the U.S. map 74, and the city map 76. FIG. 4A also illustratively shows the positional coordinates 77 for each vicinity 75a, 76a.

Figure 5:
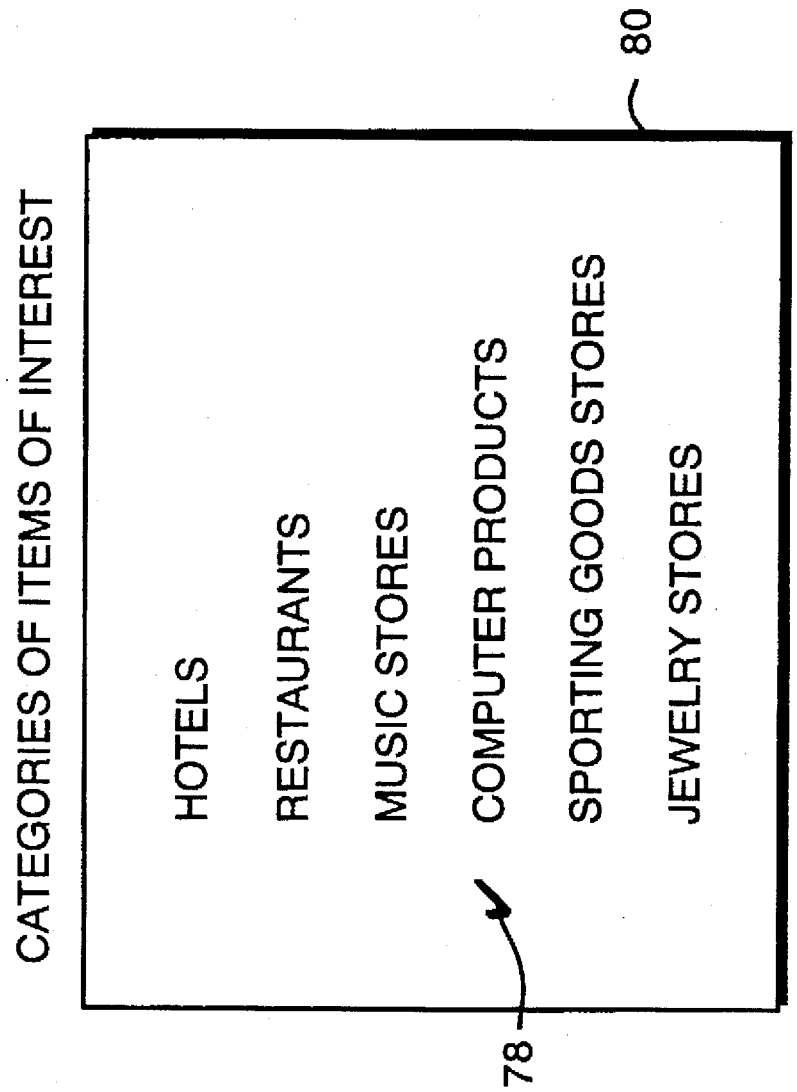
FIG. 5 shows a typical menu of categories of items of interest which are selectable by a user of the system of FIG. 1.

FIG. 5 illustrates one embodiment of the invention wherein a user selects the associated category for the items of interest from a display menu of possible items of interest. This display to select the category is preferably displayed upon activation of the remote port 16; or, alternatively, the display is commanded by a user of the system, such as by activating the "NEW SEARCH" key 76, FIG. 1. Accordingly, a user can start a new search for items of interest in a selected category by first pressing the "NEW SEARCH" key 76. Alternatively, a user can select an additional category by selecting the "ADD CATEGORY" key 46. In this manner, more than one category can be displayed at one time within the geographic vicinity.

By way of example, upon pressing the key 76, FIG. 5 illustrates one embodiment of the invention which provides a listing of possible categories of items of interest in a menu 78. A user of the system 10 can select any desired category in the menu, such as by pointing and clicking on the selected item. In this example, the user has selected "computer products," a category which was used in the illustration of FIG. 2 and which shows the selection by a check-mark 78. A user can thereafter press the "ADD CATEGORY" key 46 and select one other desired category in the menu, such as "sporting goods stores".

Alternative to the embodiment shown in FIG. 5, another embodiment of the invention provides a word association technique, known to those skilled in the art, which allows any category of items of interest to be selected by directly typing the desired search area. For example, a user of the invention could press the "NEW SEARCH" key 76 and thereafter type "computer equipment" or "computers," or other similar association, and the controller 14 of FIG. 1 would determine the best fit to the possible categories stored in the database 12 to display to the user. If the association were narrow enough, the system 10 immediately displays the items of interest within the "computer products" category, as above. However, if the search is too broad, the system can prompt the user for more information (such as known to those skilled in the art). By way of example, if a user types "computers," the system can question, or prompt, the user at the port 16 for "products," "services," or "rentals," which can thereafter be selected by the user.

The advantages of a system constructed according to the invention are several. Specifically, the invention provides a selectable display of items of interest at nearly any location, remote from the user, or centered relative to the user within the desired geographical vicinity. Further, once the display of the selected items of interest is isolated, the system provides a hard-copy for the user to walk away with. With increased usage of the invention, a corresponding increase in the number of remote access ports provides flexibility for users who can, thereby, access the system from widely accessible commercial locations, e.g., airports, car rental agencies, and train stations. In addition, the remote access port of the invention can be located at a user's home, providing even greater flexibility for those persons who regularly travel (or who regularly need information about items of interest at a selected geographic vicinity). A person's home computer system provides data processing capability which, with a modem and software configured to communicate with the database, can provide many, if not all, of the features of the remote access port 16 described above. As such, the remote access port of the invention can include personal computers, subnotebooks, notebooks, Apple's Newton product, facsimiles, phones, cellular, mainframes, minis, interactive television and/or hybrid products.

Figure 6A:
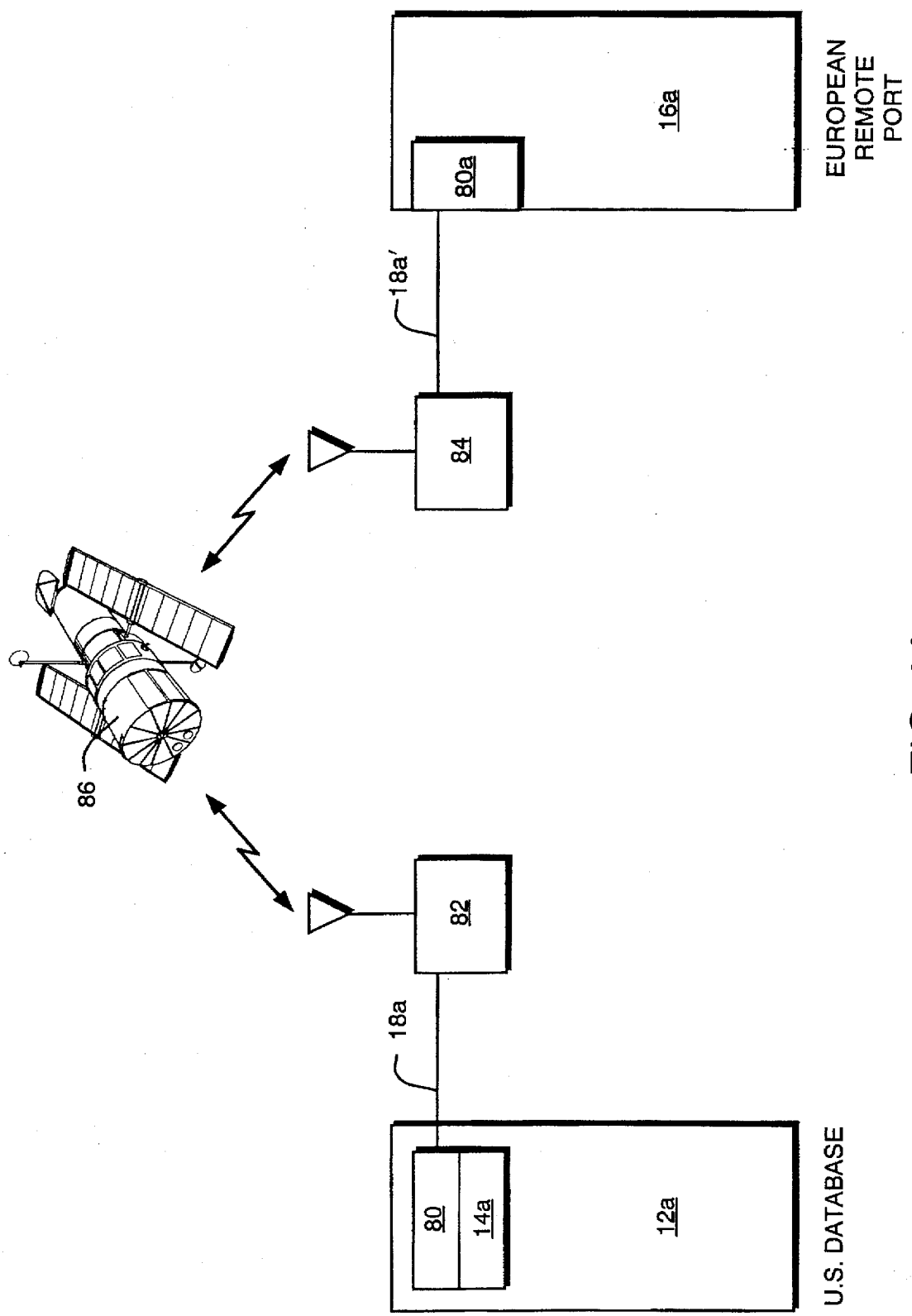

FIG. 6A illustrates a system, including a telephone-modem-satellite communications link, constructed according to the invention. Specifically, FIG. 6A shows a database 12a and controller 14a, which are illustratively located in the United States and which are similar to the database 12 and controller 14 of FIG. 1. The database and controller 12a, 14a connect and communicate with a remote port 16a, which is illustratively located in Europe and which is similar to the port 16 of FIG. 1. A modem 80 couples to the controller 14a, such as known to those skilled in the art, and further to a telephone line 18a. The telephone line 18a connects through the telephone network to the telephone relay center 82 which provides communications, such as overseas communications, to a remote relay center 84 via a satellite 86. The relay center 84 connects to the remote port 16a (including an internal modem 80a) by the land-based telephone line 18a' so that, in combination, a user of the remote port 16a can access information from the database such as described above.

It should be apparent to those skilled in the art, for example, that the lines 18a and 18a' can also be constructed with fiber-optic cabling, co-axial cabling, internet communications and the like.

FIG. 6B illustrates other embodiments of the invention for communicating between (i) the database 12b and controller 14b and (ii) the remote port 16b. A cellular communicator 88 connects to the controller 14b and communicates, via an antennae 90, with the established cellular communications network 92. The communications link is completed with the remote port 16b, including its own antenna 94 and cellular communicator 88b, so that a user of the port 16b can communicate, as above, with the database 12b.

It should again be apparent to those skilled in the art that the communications methods described and illustrated herein can be modified, in accord with the invention, to form other communication links. For example, portions of the communications link of FIG. 6A can be mixed with portions of the link of FIG. 6B to establish a working and acceptable link according to the invention.

Further, the communications link of FIG. 6B can be replaced with other communications mechanisms known to those in the art. For example, the antennas 90, 94 and communicators 88, 88b can be replaced by radiowave or microwave devices which communicate via a compatible network instead of a cellular network 92.

FIG. 7A illustrates one embodiment of the invention wherein a display 22c, such as the display 22 of FIG. 1, includes—or is replaced by—a hard-copy printer 100, such as a computer printer or facsimile. In such an embodiment, a user at the port 16c receives a hard-copy 102 of the interactive communications between the port 16c and the database 12, FIG. 1. As above, the user commands selective display of data via the keyboard 24c and/or mouse tracker 25c, and a display of the geographic vicinity with the selected items of interest in the selected category are provided via the printer 100.

It should be apparent to those skilled in the art that one acceptable remote port, according to the invention, includes a port comprising a printer 100 and a telephone (not shown). In such an embodiment, a user accesses the database by telephoning the database and requesting a display of items of interest in the selected category and geographic vicinity. The controller 14 of FIG. 1 can include voice recognition software and hardware, known to those skilled in the art, which prompts the user for requests and identifies and responds to the user's verbal replies. After identifying the user's desired category and present location (or intended destination location), the database transmits information in a form recognizable by the printer 100 so that the geographic vicinity and items of interest are displayed to the user at the telephone/printer remote port.

Alternatively, a user can fax selections for the category and geographic vicinity of interest as a hard-copy. A system administrator at the database can interpret the user's selection sheet and command the transmission of the requested information, including the items of interest, back to the user. Alternatively, the database can interpret the user's selections on the sheet to automatically respond and transmit the appropriate display of information, including the items of interest, to the user.

FIG. 7B shows another remote port 16d which includes a voice generation system 110 and speaker 112. In such an embodiment, a user at the port 16d (i) listens to questions, or reads messages on the display 22d, as prompted by the database, and (ii) answers the questions by the keyboard 24d. After the system identifies the user's desired geographic location and category, a print-out or display of the information is made available to the user, such as described above.

Figure 8:
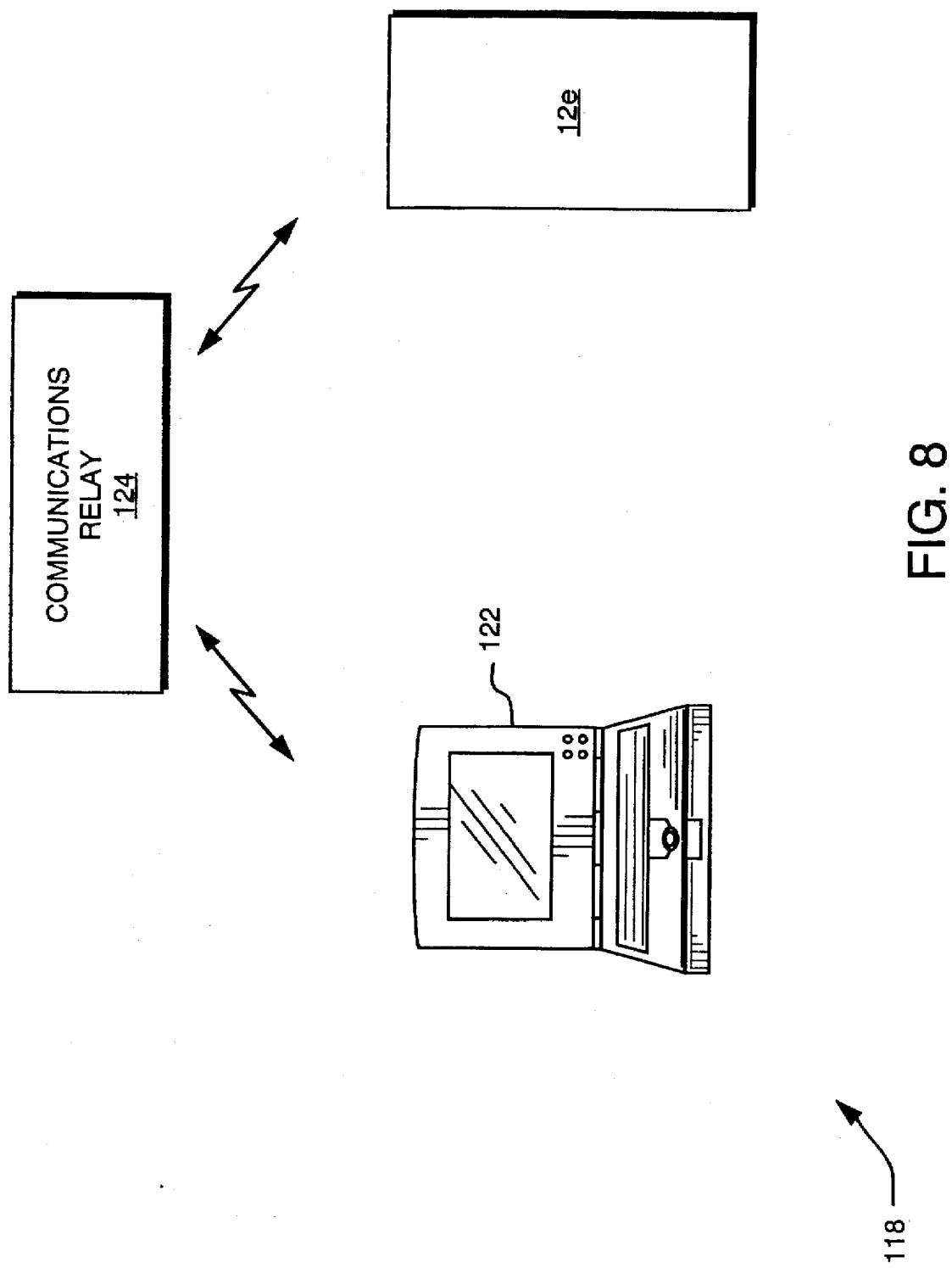
FIG. 8 illustrates a system constructed according to the invention and which includes a mobile remote port for accessing the locations of the selected items of interest.

FIG. 8 illustrates a mobile remote system 118 constructed according to the invention. A user holds one of several hand-held devices 122 which provide both display capability and transmit/receive capability to a remote relay 124, e.g., a cellular or radiowave communication relay. The device 122 thus operates as the remote port 16 of FIG. 1. The device 122 can additionally include a GPS receiver to accurately determine the user's positional coordinates in real-time, or a PCMCIA Type II or Type III modem interface which can be miniaturized to credit card size. Alternatively, the user can specify his position coordinates and transmit that information to the database 12e. In this illustrated embodiment, the system 118 continually redefines the geo-definition of the geographic vicinity based upon the positional coordinates of the user. Data is assembled and maintained using the positional coordinates to generate a map of the geographic vicinity relative to the user and including the locations of the items of interest. As above, this geographic vicinity is assumed to be within a walking distance of the user; however, the user can select a greater radius for display, or another destination location, as needed.

The invention generally incorporates software to facilitate the several embodiments described herein and to support the principles of the invention. As known to those in the art, the data within the database can be maintained, for example, on a SQL-server, or in xBASE. The software is preferably portable to other operating systems, such as to Apple, Apple/IBM, Unix, DEC, OS/2, DOS, Windows 3.1, Windows '95; and preferably allows scalability to 64-bit architectures and greater, as technology advances.

In accord with the invention, software code supporting the database interaction with the remote port can include object-oriented programming, Visual Basic, and other software architectures configured to allow user interaction, portability to other platforms, interface with the internet or other gateways, and relational management.

FIG. 9 illustrates one embodiment of database architecture 130 which is suitable for use as the database 12 of FIG. 1. Specifically, the architecture 130 includes separate phone and fax interfaces, 131, 132, respectively, to interface with any one of the remote ports, e.g., the port 16 of FIG. 1. FIG. 10 illustrates system architecture including database architecture 140 and remote port architecture 141 connected via a pair of phone lines 142, 143 to, respectively, a touch-tone phone 142a and fax machine 143a. In this manner, a user 144 can make requests and listen to responses on the phone 142a, and receive maps and instructions via the fax machine 143a.

Other modules within the database architectures 130 and/or 140 include the following:

Communications managers 133, 133' (FIGS. 9 and 10, respectively) handle all data transfers for a single internal modem (or telephone interface controller) 131 in the host database, e.g., a personal computer. It responds to remote requests for data by passing the requests to a session manager 138, and handles all modem control issues, such as answering incoming calls. The communications manager 133' of FIG. 10 is configured to service users who access the database from a remote port comprising a dial-up telephone 142a. As such, the manager 133' translates touch-tone inputs into data and fax transmission requests to be sent to the session manager 138, and monitors the line 142 for time-outs when a user 144 forgets to actively disconnect. The manager 133' can also translate data from the session manager 138 into synthesized voice output for presentation to an end user 144.

The fax manager 134 handles all requests from the session manager 138 to fax and receive documents to and from end users connected through a communications link.

Because there generally are a plurality of remote ports arranged for access to the system database, there are preferably a plurality of communications managers 133 and modems 131 to service requests from the remote ports. Likewise, although the database generally includes one fax manager 134 and one interface 132, a plurality of fax managers 134 and fax machine interfaces 132 can be incorporated therein. Accordingly, the host database can answer and service a variety of remote ports simultaneously.

The session manager 138 tracks and controls information for each active session being hosted by the database architecture. It responds to requests for data passed to it by each communications manager 133 operating in the database architecture, and prioritizes, queues, and forwards these data requests to the end user data server 136. The manager 138 also forwards data requests to the system data server 137 (FIG. 9 only) to log certain system information, such as user connection times, errors, system utilization, and other administrative functions.

In FIGS. 9 and 10, database storage memory 139 stores information which is accessible by the end user data server 136 and which is responsive to user requests, including the selected city, locations of items of interest, maps of geographic vacinities, and advertising information. In FIG. 10, an additional database storage memory 139a stores information which is accessible by the system data server 137 and which stores information such as system usage and transaction logging.

The end user data server 136 responds to requests from the session manager 138 by providing data that has been requested for transmission to the remote port. This data includes that information required to place items of interest on the selected geographic vicinity. Preferably, the end user data server 136 is the only mode of access to the specific map data, and thus all requests for this data are made through this server.

In FIG. 9, the system data server 137 interacts with the session manager 138 to record system administrative data. The server 137 responds to requests from the session manager 138 to provide or record information used to track system usage, system response times, user preferences, and other data items that are used to optimize the different modules within the architecture 130.

The flow and control of information by the information controller 14, FIG. 1, can include several of the functions shown illustratively in FIG. 11. Specifically, a display manager 150 controls the drawing of maps (i.e., geographic vacinities) on the screen 22 and further controls status messages to a user of the system. The manager 150 responds to requests for screen updates and status message display from a system kernel module 159, described in more detail below. It also sends requests to a map manager 151 when rendering maps to the display, and sends requests to a data manager 152 in order to obtain system information required to update the display 22 or to present status messages to the user.

A map manager 151 manages map data and provides data for drawing maps to the display manager 150. The manager 151 responds to requests from the display manager 150 by providing information appropriate to the current context of the session, such as the graphical image (e.g., the geographic vicinity and advertising information) that needs to be displayed, the locations on the screen 22 of the items of interest, and the location and content of the rifles of the items of interest.

A data manager 152 handles all data requests from the system kernel module 159, map manager 151, and print manager 153, and further interfaces to external data sources 155, 156 (these databases 155, 156 store raw data as the database information). The manager 152 determines the need for remote data access via a communications manager 157, and passes on remote data requests to the manager 157. The manager 152 also provides all data access services to other managers and modules within the controller 14. For example, if the data is not stored locally, the data manager 152 sends a request to the communications manager 157 to provide the desired data.

A print manager 153 handles and controls printing activities in the system, such as to a connected printer 154 (similar to the printer 110, FIG. 7C; or such as a printer connected directly to the database 12). By way of example, the manager 153 requests map and other data from the data manager 152 to create and print outputs requested by the system kernel module 159. Specifically, the manger 153 responds to requests from the system kernel module 159 for print services, and sends requests to the data manager 152 based upon the system kernel requests. The manager 153 uses the information supplied by the data manager 152 to create formatted output for printing, such as by utilizing a standard Windows™ print driver interface to print the requested output.

The communications manager 157 handles all remote communications requirements, including remote data requests, and further accepts and transfers raw data from a remote data source 158 (such as data downloads to modify or add to data within the database). The manager 157 responds to requests from the system kernel module 159 for initialization, connection, and shutdown of remote connections appropriate with the actual hardware in use. It also responds to remote data requests from the data manager 152 by sending the request for remote data to the remote data source 158. When the remote data source 158 responds to the request, the communications manager 157 passes that response on to the data manager 152.

The system kernel module 159 traps all user inputs and determines required actions in the system, including those actions responsive to a user's inputs 160 (such as described above in connection with the keyboard 24). Specifically, the module 159 responds to mouse movements, mouse button clicking, and typing. Depending on the user's input, the module 159 will send requests for services to (i) the display manager 150 to update the display, (ii) the data manager 152 to provide information concerning the map and/or other system needs, (iii) the print manager for printing services, and (iv) the communications manager 157 for remote communications services.

FIG. 12 illustrates one preferred embodiment of the invention wherein certain advertising information is included within, or attached to, the geographic vicinity which is displayed or printed to a user at a remote port. For example, FIG. 12 shows one illustrative geographic vicinity 30' which was shown previously in FIG. 2, except that an advertisement 180 is displayed as part of that vicinity (the advertisement 180 is generically shown with the text "ADVERTISEMENT," when, in fact, a paying customer's name or company is usually displayed at that location). In the normal use of the invention, the advertiser who pays for the advertisement is generally associated with the items of interest being displayed. For example, a credit card bank or sporting goods manufacturer typically specify (and pay for) the "advertisement" logo or wording.

It should be apparent to those skilled in the art that any of the items of interest within a displayed geographic vicinity can be selected by a user and that the database can thereafter supply additional detail about that selected item of interest. In such an embodiment of the invention, the database is configured to store such additional detail and also to transmit this information to the remote port when selected. The remote port, in turn, displays the information for the user. By way of example, if the selected category is "restaurants" and a user selects a particular restaurant (i.e., one of the items of interest), a display of additional detail can, for example, include a digital picture of the layout of the dining room or bar. Additionally, the entertainment scheduled for that evening can be displayed while a recording of any associated music is played at the remote port's speakers.

Thus, a further embodiment of the invention includes a digitized, multi-media presentation that is transmitted to the remote port when an associated item of interest is selected. Using a camrecorder and/or other video capture, storage, and editing analogue or digital devices, for example, a short video clip is embedded in the data associated with the information about the items of interest and transmitted and displayed when selected.

In order to utilize the above-described multi-media presentation, the system of the invention must provide sufficient bandwidth, processing speed, and display resolution, and the remote port must display the multi-media transmissions with sufficient speed and resolution so as to be convenient to the user of that information. Typically, the minimum central processing unit of the database and remote port run at least at 16 MHZ and is based on a CISC (complex instruction set) architecture. Further, the database, remote port and communications link should be able to transmit data at an uncompressed speed of 9600 baud per second; preferably, these devices should be faster, e.g., 28.8 Kbps, utilizing modems that subscribe to emerging industry standards such as V.34. Additionally, special connections may be required at the server, including what are known to those skilled in the art as SLIP, PPP, and TC/ICP protocols. In some cases, where additional bandwidth may be required, the modem is replaced with special interfaces provided by regional telecommunications systems that also provide dedicated optic fiber cabling. Some of those linkages are known as T1, ISDN, and 56 Kbps wide band-width connections. In addition, bandwidth may be enhanced by microwave and other communication links that do not require direct cabled connections.

The invention thus attains the objects set forth above, in addition to those apparent from the preceding description. Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

What is claimed is:

1. System for remotely determining the position of a selected category of items of interest in a selected geographic vicinity from a database, the system comprising
   (A) a database for storing information about a plurality of items of interest, the information including, for each of the items of interest, positional coordinates, a geographic vicinity, and at least one associated category, the positional coordinates locating the geographic vicinity,
   (B) a communications link for communicating between a user of the system and the database, (C) means for transmitting a portion of the information in the database to the user via the link upon receipt of a request signal representative of a selected category and geographic vicinity, the transmitted portion of the information including identification of a position for each of the items of interest within the selected category and geographic vicinity and relative to the positional coordinates and other items of interest within the vicinity, and (D) a port for remotely accessing the portion of information via the link, the port generating the request signal in response to inputs by the user which are representative of the selected category and geographic vicinity, the port having a user interface for accepting the inputs and for indicating to the user the position of each of the items of interest in the selected category and geographic vicinity.

2. System according to claim 1 wherein the link comprises at least one of the following: a telephone link, satellite link, radio-frequency link, infra-red link, internet link, facsimile link, fiber-optic link, coaxial cable link and television link.

3. System according to claim 1 wherein the database is selected from the group consisting of a personal computer, mainframe, work-station, mini-computer, and a digital data processor.

4. System according to claim 1 wherein the user interface further comprises a member of the group consisting of a television, telephone, facsimile, audible speaker, and personal computer display, for indicating information to the user.

5. System according to claim 1 wherein the user interface further comprises a member of the group consisting of a television interface, telephone interface, facsimile interface, and personal computer interface, for communicating the inputs to the port.

6. System according to claim 1 wherein the geographic vicinity comprises spatial detail of the items of interest.

7. System according to claim 1 wherein the geographic vicinity comprises a map of the items of interest in the selected category and selected geographic vicinity.

8. System according to claim 1, further comprising means for interpreting the inputs by the user and for formulating the inputs into the request signal.

9. System according to claim 1, further comprising means for interpreting certain of the inputs as items or interest and for transposing such inputs into a selected category automatically.

10. System according to claim 1, wherein the set of positional coordinates comprises a location of a user of the system.

11. System according to claim 1, wherein the set of positional coordinates comprises information identifying a destination location within the geographic vicinity.

12. System according to claim 1, further comprising data representing the information.

13. System according to claim 1, wherein the information comprises additional detail for at least one of the items of interest, and further comprising means for selecting and communicating the additional detail to the user.

14. System according to claim 13, wherein the additional detail is selected from the group of video, prerecorded music, and digital pictures.

15. System according to claim 1, wherein the information comprises an advertisement associated with at least one of the items of interest, and further comprising means for communicating the advertisement to the user.

16. System according to claim 1, wherein the information comprises a plurality of discrete geographic vicinities, and further comprising means for hierarchically selecting any of the discrete vicinities from the port.

17. Database apparatus for storing information about a plurality of items of interest, the information including, for each of the items of interest, a geographic vicinity, positional coordinates locating the geographic vicinity, and at least one associated category, comprising (A) a communications link for communicating between a user of the database apparatus and a remote port, and (B) means for transmitting a portion of the information to the user via the link upon receipt of a request signal representative of a geographic vicinity and a selected category of the items of interest, the transmitted portion of the information including identification of a position for each of the items of interest within the selected category and geographic vicinity, the position for each of the items of interest within the Selected category and geographic vicinity being defined relative to the positional coordinates and other items of interest within the selected category and geographic vicinity.

18. Database apparatus according to claim 17 wherein the link comprises at least one of the following: telephone link, satellite link, radio-frequency link, infra-red link, internet link, facsimile link, fiber-optic link, coaxial cable link, television link, and combinations thereof.

19. Database apparatus according to claim 17 wherein the means for transmitting comprises a member of the group of a personal computer, mainframe, and data processor.

20. Database apparatus according to claim 17 wherein the geographic vicinity comprises spatial detail of the items of interest.

21. Database apparatus according to claim 17 wherein the geographic vicinity comprises a map of the items of interest in the selected category and selected geographic vicinity.

22. Database apparatus according to claim 17, further comprising data representing the information.

23. Database apparatus according to claim 17, wherein the information comprises additional detail for at least one of the items of interest, and further comprising means for communicating the additional detail to the remote port upon receipt of a signal indicating that a user has selected one of the items of interest.

24. Database apparatus according to claim 17, wherein the information comprises an advertisement associated with at least one of the items of interest, and further comprising means for communicating the advertisement to the remote port.

25. Database apparatus according to claim 17, wherein the information comprises a plurality of discrete geographic vicinities, and further comprising means for hierarchically storing and accessing any of the discrete vicinities in response to user inputs at the remote port.

26. Remote access port for remotely accessing a selected category of items of interest in a selected geographic vicinity from a database, the database being of the type which stores information about a plurality of items of interest, the information including, for each of the items of interest, a geographical vicinity, positional coordinates that locate the vicinity, and at least one associated category, the remote access port comprising (A) a communications link for communicating between a user of the remote access port and the database, and (B) means for generating a request signal representative of a selected category and a selected geographic vicinity of the items of interest in response to inputs by the user, the remote access port having a user interface for accepting the inputs and for indicating to the user the position of each of the items of interest within the selected category and geographic vicinity, the position for each of the items of interest within the selected category and geographic vicinity being defined relative to the positional coordinates and other items of interest within the selected category and geographic vicinity.

27. Remote access port according to claim 26 wherein the user interface further comprises one or more members of the group consisting of a television, telephone, facsimile, audible speaker, and personal computer display, for indicating the items of interest to the user.

28. Remote access port according to claim 26 wherein the user interface further comprises one or more members of the group consisting of a television interface, telephone interface, facsimile interface, and personal computer interface, for communicating the inputs by the user to the database.

29. Remote access port according to claim 26, further comprising means for interpreting the inputs by the user and formulating the inputs into the request signal.

30. Remote access port according to claim 26, further comprising means for interpreting certain of the inputs as items or interest and for transposing such inputs into a selected category automatically.

31. Remote access port according to claim 26 wherein said means for generating a request signal comprises one of a personal computer.

32. Remote access port according to claim 26, wherein the information comprises additional detail for at least one of the items of interest, and further comprising means for (i) generating a signal representative of a user selection of at least one of the items of interest, and (ii) communicating the additional detail to the user.

33. Remote access port according to claim 26, wherein the information comprises an advertisement associated with at least one of the items of interest, and further comprising means for communicating the advertisement to the user.

34. Remote access port according to claim 26, wherein the information comprises a plurality of discrete geographic vicinities, and further comprising means for hierarchically selecting any of the discrete vicinities in response to user inputs.

35. A method for remotely determining the position of each of a selected category of items of interest in a selected geographic vicinity from a database, comprising the steps of: (i) storing information about a plurality of items of interest in the database, the information including, for each of the items of interest, a geographic vicinity, positional coordinates that locate the vicinity, and at least one associated category; (ii) accessing the database from a remote port and over a communication link; (iii) communicating, from the remote port, information representative of a selected category and a selected geographic vicinity to the database; and (iv) transmitting a portion of the information from the database and to the user over the link, the information including, at least, identification of the position for each of the items of interest relative to the positional coordinates and other items of interest within the selected category and geographic vicinity.

36. A method according to claim 35, wherein the step of communication information further comprises the step of generating a request signal indicative of the selected category and vicinity.

37. A method according to claim 36, wherein the step of transmitting a portion of the information further comprises the step of responding to the request signal.

* * * * *